(12) United States Patent
Alcott

(10) Patent No.: US 6,999,570 B2
(45) Date of Patent: Feb. 14, 2006

(54) METHODS, SYSTEMS AND ARTICLES FOR ORDERING A TELECOMMUNICATION SERVICE

(75) Inventor: Scott Patrick Alcott, Oak Park, IL (US)

(73) Assignee: SBC Properties L.P., Reno, NV (US)

(*) Notice: Subject to any disclaimer, the term of this patent is extended or adjusted under 35 U.S.C. 154(b) by 647 days.

(21) Appl. No.: 09/899,378

(22) Filed: Jul. 2, 2001

(65) Prior Publication Data

US 2001/0046284 A1 Nov. 29, 2001

Related U.S. Application Data

(63) Continuation of application No. 09/044,618, filed on Mar. 19, 1998, now Pat. No. 6,324,273.

(51) Int. Cl.
H04M 3/42 (2006.01)

(52) U.S. Cl. ............... 379/207.02; 379/88.23; 379/211.01; 379/216.01; 379/201.12

(58) Field of Classification Search ........... 379/88.13, 379/88.16, 88.19–88.21, 88.22–88.25, 88.18, 379/142.01, 142.04, 142.05, 142.08, 201.01, 379/201.02, 201.12, 207.02, 207.11, 207.15, 379/210.01, 211.01, 212.01, 215.01, 216.01, 379/221.08–221.11

See application file for complete search history.

(56) References Cited

U.S. PATENT DOCUMENTS

| | | | |
|---|---|---|---|
| 4,232,199 A | 11/1980 | Boatwright et al. |
| 4,782,519 A | 11/1988 | Patel et al. |
| 5,012,511 A | 4/1991 | Hanle et al. |
| 5,023,904 A | 6/1991 | Kaplan et al. |
| 5,086,461 A | 2/1992 | Thorn et al. |
| 5,150,399 A | 9/1992 | Yasuda |
| 5,182,766 A | 1/1993 | Garland |
| 5,216,703 A | 6/1993 | Roy |
| 5,222,125 A | 6/1993 | Creswell et al. |

(Continued)

Primary Examiner—Roland Foster
(74) Attorney, Agent, or Firm—Brinks Hofer Gilson & Lione

(57) ABSTRACT

A first method comprises initiating a telecommunication network trigger based upon a service code dialed from an originating party. The service code includes an alphabetical abbreviation for a name of a telecommunication service. In dependence upon the trigger, a step of provisioning the telecommunication service for the originating party is performed. A second method comprises initiating a telecommunication network trigger based upon a code including "*M" or "#M". In response to the trigger, a step of providing a menu of a plurality of telecommunication options in is performed. Systems and articles associated with the first and second methods are disclosed.

11 Claims, 3 Drawing Sheets

U.S. PATENT DOCUMENTS

| | | | |
|---|---|---|---|
| 5,272,748 | A | 12/1993 | Davis |
| 5,283,887 | A | 2/1994 | Zachery |
| 5,345,501 | A | 9/1994 | Shelton |
| 5,416,833 | A | 5/1995 | Harper et al. |
| 5,436,957 | A | 7/1995 | McConnell |
| 5,465,295 | A * | 11/1995 | Furman ............... 379/221.14 |
| 5,491,742 | A | 2/1996 | Harper et al. |
| 5,509,060 | A | 4/1996 | Hall et al. |
| 5,524,146 | A | 6/1996 | Morrisey et al. |
| 5,526,413 | A | 6/1996 | Cheston, III et al. |
| 5,528,677 | A | 6/1996 | Butler et al. |
| 5,557,780 | A | 9/1996 | Edwards et al. |
| 5,619,562 | A | 4/1997 | Maurer et al. |
| 5,644,619 | A | 7/1997 | Farris et al. |
| 5,661,784 | A | 8/1997 | Zinke |
| 5,745,553 | A * | 4/1998 | Mirville et al. ........ 379/201.05 |
| 5,751,802 | A | 5/1998 | Carr et al. |
| 5,752,186 | A | 5/1998 | Malackowski et al. |
| 5,835,583 | A | 11/1998 | Hetz et al. |
| 5,933,484 | A * | 8/1999 | Partridge, III ......... 379/201.01 |
| 5,999,611 | A | 12/1999 | Tatchell et al. |
| 6,031,903 | A * | 2/2000 | Partridge, III ......... 379/201.01 |
| 6,137,873 | A * | 10/2000 | Gilles .................... 379/202.01 |
| 6,181,787 | B1 * | 1/2001 | Malik .................... 379/207.11 |
| 6,188,757 | B1 * | 2/2001 | Malik .................... 379/207.02 |
| 6,324,273 | B1 * | 11/2001 | Alcott ................... 379/201.03 |
| 6,499,017 | B1 * | 12/2002 | Feibelman et al. ............. 705/8 |
| 6,504,912 | B1 * | 1/2003 | Glossbrenner ........... 379/88.01 |
| 6,546,095 | B1 * | 4/2003 | Iverson et al. ......... 379/201.12 |

* cited by examiner

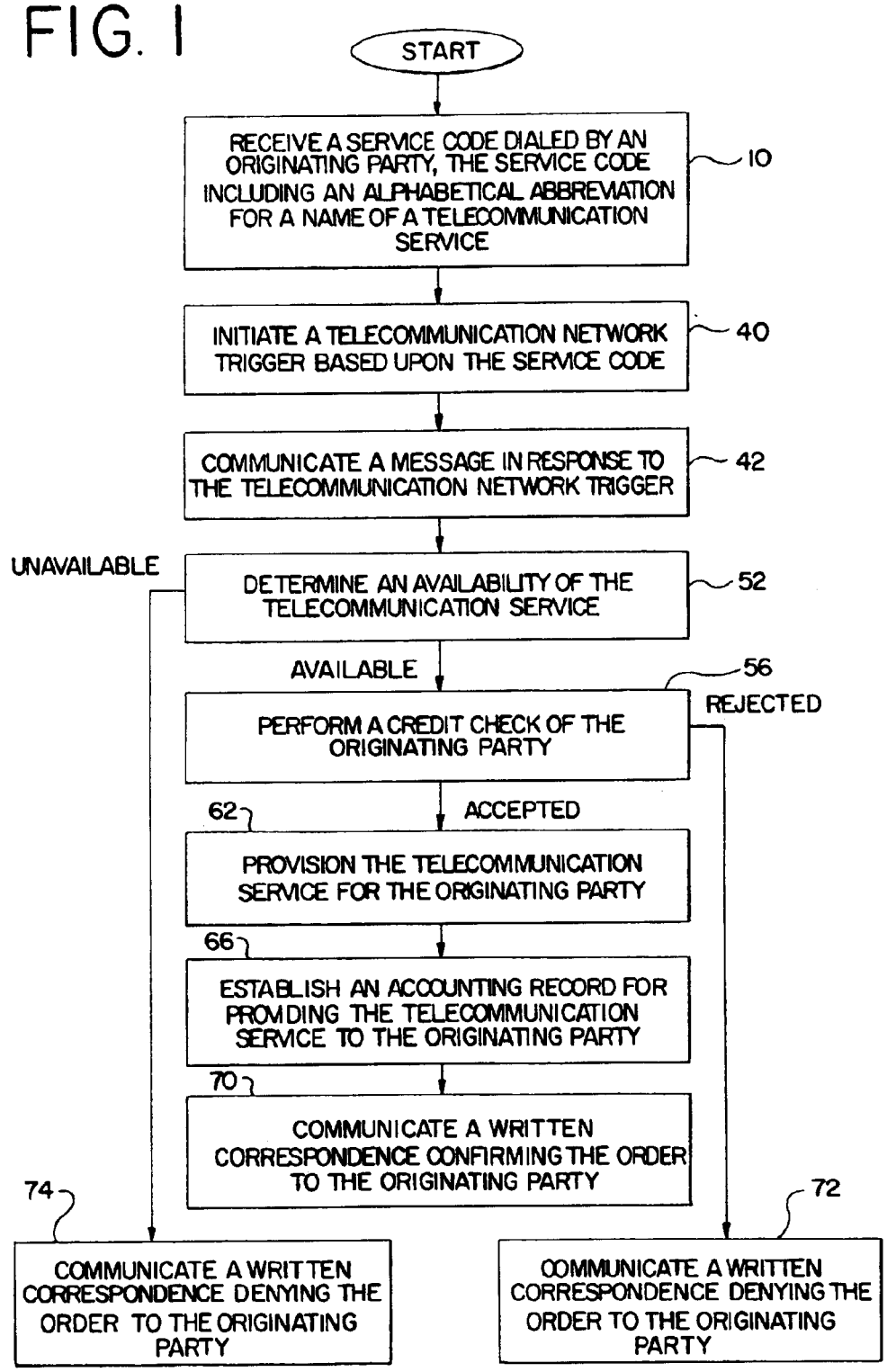

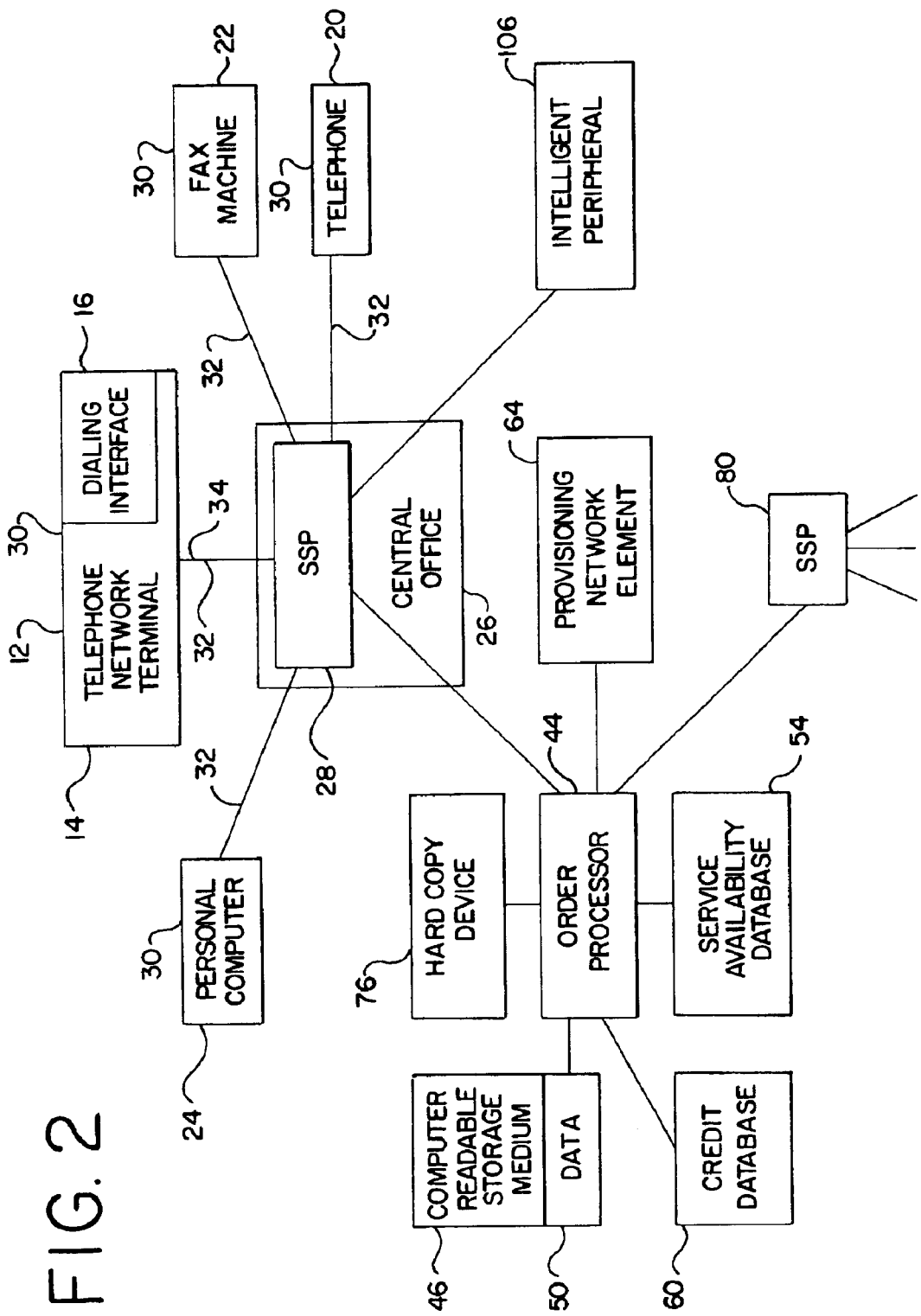

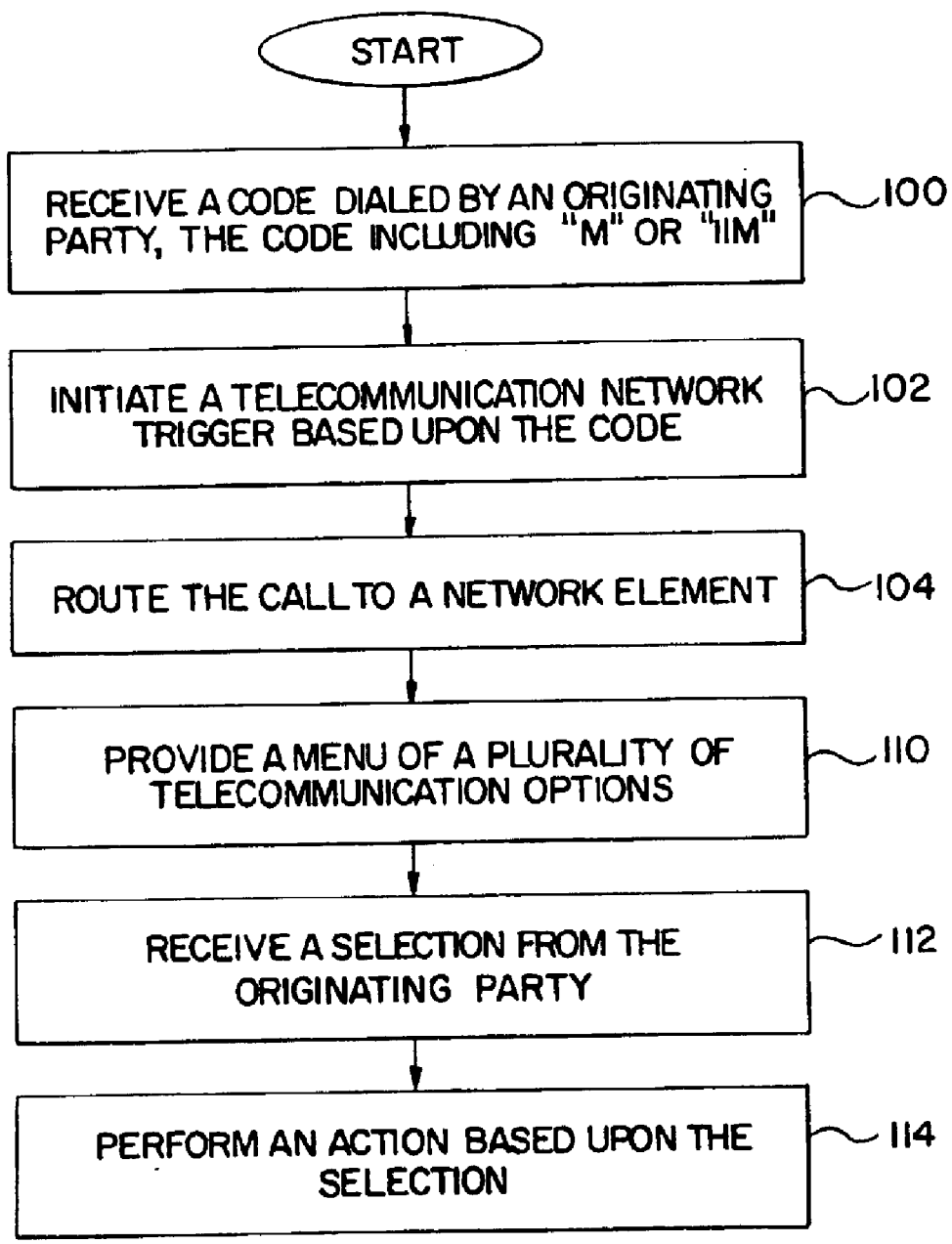

METHODS, SYSTEMS AND ARTICLES FOR ORDERING A TELECOMMUNICATION SERVICE

CROSS-REFERENCE TO RELATED APPLICATION

The present patent document is a continuation of application Ser. No. 09/044,618, filed Mar. 19, 1998 now U.S. Pat. No. 6,324,273, the disclosure of which is hereby incorporated by reference.

TECHNICAL FIELD

The present invention relates to methods and systems for ordering a telecommunication service.

BACKGROUND OF THE INVENTION

One known approach for ordering a telecommunication service involves an end user placing a call to a live customer service representative. During the call, the customer service representative verbally takes an order from the end user for one or more telecommunication services. Upon receiving the order, the one or more telecommunication services can be provisioned to a telephone line associated with the end user.

A second known approach for ordering a telecommunication service uses an automated, rapid-order system in place of live customer service representatives. Using this approach, the end user places a call to the automated, rapid-order system. During the call, the end user is presented with various menus of service options and information. The end user responds to the menus by entering one or more dialing digits to identify one or more telecommunication services to be ordered. The end user additionally enters a telephone number identifying a telephone line for which the one or more telecommunication services are to be applied. Optionally, the rapid-order system includes a voice response unit (VRU) to detect vocal responses. After receiving the order, the rapid-order system initiates that the one or more services be provided for the telephone line.

A disadvantage of these approaches is that the telephone number to order the services may not be readily known by the end user. A similar disadvantage for initiating telecommunication features results from the variety of their associated codes and protocols. For example, a conference calling feature is initiated by entering a flash hook signal, directory assistance is initiated by dialing "411", telecommunication difficulties can be reported by dialing "611", and caller identification is blocked by dialing "*67".

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 is a flow chart of an embodiment of a first method of processing an order for a telecommunication service;

FIG. 2 is a block diagram of an embodiment of a system for processing an order for a telecommunication service; and FIG. 3 is a flow chart of an embodiment of a second method of processing an order for a telecommunication service.

DETAILED DESCRIPTION OF PREFERRED EMBODIMENTS

Embodiments of the present invention provide a network-enabled platform for customers to directly order, provision, and establish subscription telecommunication service products using touchtone keys. Telecommunication services can be ordered without having to call into a VRU or talk to a live customer service representative. Customers can pick-up any telephone in their household or business and order subscription services to that line by dialing a service code and then hanging up. No prompts, messages, or other inputs are required.

A network element recognizes the service code, conducts an immediate credit and feature-availability check, automatically launches acceptance or rejection confirmation letters, establishes a billing record, and provisions the service in the telephone network. To protect from accidental or fraudulent ordering, a 30 day, buyer's remorse, no-cost guarantee can be disclosed in the acceptance confirmation letter.

A first approach for ordering a telecommunication service is described with reference to FIGS. 1 and 2. FIG. 1 is a flow chart of an embodiment of a first method of processing an order for a telecommunication service. FIG. 2 is a block diagram of an embodiment of a system for processing the order for the telecommunication service.

Of particular interest are cases in which the order is for a subscription telecommunication service product or feature provided by a public switched telephone network (PSTN). Examples of subscription service products include, but are not limited to, a caller identification service, a voice mail service, and a call waiting service. It is noted, however, that other services and other telephone networks are also within the scope of the present invention.

As indicated by block 10, the method includes a step of receiving a service code dialed by an originating party 12. Typically, an individual associated with the originating party 12 dials the service code using a telephone network terminal 14 having a dialing interface 16. Examples of the telephone network terminal 14 include, but are not limited to, a telephone set 20 having a telephone keypad or an alternative dialing interface, a facsimile machine 22 having a dialing interface, and a personal computer 24 having a modem and dialing capability.

Using a landline telephone set, for example, the individual can take the telephone off-hook (e.g. by picking up a handset), dial the service code using its keypad, and hang up (e.g. by placing the telephone on-hook by replacing the handset). Using a wireless telephone set, for example, the individual can dial the service code, select the "SEND" key to place a call, and thereafter can terminate the call by selecting the "END" key. Preferably, no audio prompts or audio messages, other than a dial tone, are communicated to the originating party 12 during either of these processes.

Typically, the service code is received by a telephone network element at a central office 16 within the PSTN. The telephone network element can include a switch such as a service switching point 28. It is noted that, in general, the service code can be received by any element of a telephone network.

The central office 26 serves a plurality of telephone parties 30 including the originating party 12. In a landline telephone network, for example, the central office 16 provides a plurality of telephone lines 32 to serve the telephone parties 30. The telephone lines 32 include a telephone line 34 associated with the originating party 12.

Each of the telephone parties 30 has a unique identifier associated therewith. In the landline telephone network, for example, each of the telephone lines 32 is identified by an associated calling party identification code or automatic network interface (ANI) code.

The service code includes an alphabetical abbreviation for a name of the telecommunication service being ordered. The alphabetical abbreviation is based upon letters associated with each key of a telephone keypad. For example, in a standard telephone keypad, the letters A, B and C are associated with a "2" key, the letters D, E and F are associated with a "3" key, the letters G, H and I are associated with a "4" key, the letters J, K and L are associated with a "5" key, the letters M, N and O are associated with a "6" key, the letters P, R and S are associated with a "7" key, the letters T, U and V are associated with an "8" key, and the letters W, X and Y are associated with a "9" key.

Preferably, the service code includes a first digit, a second digit, and an asterisk "*" prefixing the first digit and the second digit. The first digit corresponds to a first letter of a first word in the name of the telecommunication service. The second digit corresponds to a first letter of a second word in the name of the telecommunication service. For a Caller Identification service, the first digit corresponds to the letter C and the second digit corresponds to the letter I. Hence, the service code to order the Caller Identification service is *CI or *24 (or alternatively *CID or *243). For a Voice Mail service, the first digit corresponds to the letter V and the second digit corresponds to the letter M. Hence, the service code to order the Voice Mail service is *VM or *86. For a Call Waiting service, the first digit corresponds to the letter C and the second digit corresponds to the letter W. Hence, the service code to order the Call Waiting service is *CW or *29. It is noted that service codes can be formulated in this manner for a variety of other telecommunication services. It is also noted that as an alternative to the "*", an alternative key such as a "#" can prefix the first digit and the second digit.

As indicated by block 40, a step of initiating a telecommunication network trigger based upon the service code is performed. Preferably, the telecommunication network trigger includes an advanced intelligent network (AIN) trigger. The AIN trigger can include a 3-digit trigger to recognize and detect service codes having the preferred form of an * followed by a pair of service-specific digits. Typically, the AIN trigger is detected and initiated by the service switching point 28 at the central office 26.

As indicated by block 42, a step of communicating a message in response to the telecommunication network trigger is performed. The message is communicated from the service switching point 28 to an order processor 44. Preferably, the message includes the service code or an identifier thereof, and the unique telephone party identifier of the originating party 12. The unique telephone party identifier can be determined using intelligence within SS7 or an alternative common channel signaling protocol. In this way, the originating party 12 is determined without requiring the individual to enter his/her telephone number or other identification information.

The order processor 44 includes a computer to process the order based upon the message. Steps performed by the computer are directed by a computer-readable storage medium 46 having computer-readable data 50. Examples of the computer-readable storage medium 46 include, but are not limited to, an electronic storage medium such as a memory, a magnetic storage medium such as a magnetic disk, and an optical storage medium such as an optical disk.

As indicated by block 52, a step of determining an availability of the telecommunication service is performed in response to the telecommunication network trigger. The availability is determined using a service availability database 54 in communication with the order processor 44. The service availability database 54 indicates which telecommunication services have limited availability. Hence, the telecommunication service may or may not be available dependent upon the telecommunication service selected and the location of the originating party 12.

As indicated by block 56, the method includes a step of performing a credit check for the originating party 12. The originating party 12 is determined by its unique telephone party identifier, such as its calling party identifier or its ANI. The credit check is performed based upon a look-up of a credit database 60 using the telephone party identifier of the originating party 12. The credit database 60 can include a credit information source within the telephone network and/or a credit information source external to the telephone network.

The originating party 12 qualifies for the telecommunication service if the telecommunication service is available and the credit check is satisfied. If qualified, a step of provisioning the telecommunication service within the telephone network is performed for the originating party 12, as indicated by block 62. This step can include communicating a message to a provisioning network element 64 such as a service management system. The message indicates the originating party 12 and the telecommunication service. The provisioning network element 64 provisions the telecommunication service in response to receiving the message. Additionally, a step of creating or otherwise establishing an accounting record is performed as indicated by block 66. The accounting record provides a billing record for providing the telecommunication service to the originating party 12.

A step of communicating a written correspondence to the originating party 12 is performed as indicated by block 70. The written correspondence can include a welcome letter confirming that the order for the telecommunication service has been fulfilled.

The originating party 12 is unqualified for the telecommunication service if the telecommunication service is unavailable or if the credit check is unsatisfied. If the credit check is unsatisfied, a step of communicating a written correspondence to the originating party 12 is performed, as indicated by block 72. The written correspondence indicates that the telecommunication service is not being provided to the originating party 12 due to the rejected credit status.

If the telecommunication service is unavailable, a step of communicating a written correspondence to the originating party 12 is performed, as indicated by block 74. The written correspondence indicates that the telecommunication service is not being provided to the originating party 12 due to unavailability.

Each of the steps of communicating a written correspondence can include printing the written correspondence using a hard copy device 76 such as a printer, and sending the written confirmation to the originating party 12 by mail or by an alternative delivery service. Alternatively, the written correspondence can be sent to the originating party 12 by facsimile.

It is noted that the order processor 44 can be located either within or external to the central office 26. Further, the order processor 44 can serve either a single network element or a plurality of network elements. For example, the order processor 44 can serve a plurality of service switching points, including the SSP 28 and an SSP 80.

A second method for ordering a telecommunication service is described with reference to FIG. 3. The second method is described with reference to elements shown in FIG. 2. The second method provides a menu-mode network platform that customers can access to easily implement pay-per-use products and other services. This platform is automatically deployed and available on all end-user telephones. Customers activate the menu mode by dialing "*M" (for menu) from their telephone. From there, the menu-mode presents information and options.

FIG. 3 is a flow chart of an embodiment of a second method of processing an order for a telecommunication service. As indicated by block 100, a step of receiving a code dialed by the originating party 12 is performed. The code includes "*M" which indicates a menu mode feature. Alternatively, the code can include "#M". The code is received by the SSP 28 or an alternative network element.

As indicated by block 102, a step of initiating a telecommunication network trigger based upon the code is performed. Preferably, the telecommunication network trigger includes an AIN trigger recognized by the SSP 28 or an alternative network element.

As indicated by block 104, a step of routing the call to a network element, such as an intelligent peripheral 106, is performed in dependence upon the telecommunication network trigger. The intelligent peripheral 106 provides service assistant functions such as announcements, post-dialing digit collection, and optional speech recognition. Steps performed by the intelligent peripheral 106 are directed by a computer-readable storage medium having computer-readable data. The computer-readable storage medium can include an electronic storage medium, a magnetic storage medium, or an optical storage medium, for example.

As indicated by block 110, a step of providing a menu of a plurality of telecommunication options is performed. The menu is communicated, within the call, from the intelligent peripheral 106 to the originating party 12. Examples of the telecommunication options include, but are not limited to, options to order telecommunication services and pay-per-use products, an option to request directory assistance, an option to speak to a service representative, and an option to report telecommunication difficulties.

Preferably, the menu is provided in a prerecorded, verbal form by the intelligent peripheral 106. For purposes of illustration and example, the menu can include the following prerecorded message: "Welcome to the Ameritech Menu. If you already know the number of your selection, you can dial it at any time. Press 1 to conference call two people. Press 2 to call back the last person who called you. Press 3 to forward incoming calls to this phone to another phone number. Press 4 to turn-off call waiting during your next call. Press 5 to keep your phone number from being read by someone else's caller ID. Press 6 to speak to report trouble to Ameritech. Press 7 to speak to an Ameritech service representative. Press 8 for directory assistance. Press 9 to try a new Ameritech product free of charge for three months." In addition to the telecommunication options, the intelligent peripheral 106 can provide additional announcements to promote new services, to inform of changes in telecommunication services, and to provide news.

In the aforementioned example, the telecommunication options include a first option to initiate a conference call feature, a second option to initiate an automatic call back feature, a third option to initiate a call forwarding feature, a fourth option to deactivate call waiting, a fifth option to block caller identification, a sixth option to report information, a seventh option to speak to a service representative, an eighth option for directory assistance, and a ninth option to receive a product.

As indicated by block 112, a step of receiving a selection from the originating party 12 is performed. Typically, the selection includes either a digit dialed using the dialing interface 16 or a spoken selection from originating party 12. The selection corresponds to one of the options in the menu.

As indicated by block 114, the method includes a step of performing an action based upon the selection. The action can include routing the call based upon the selection, or translating the selection to a service code.

For example, in response to receiving a selection of the first option to initiate a conference call feature, a step of emulating a flash hook signal can be performed. In response to receiving a selection of the second option to initiate an automatic call back feature, a step of translating the selection to a "*69" code can be performed. In response to receiving a selection of the third option to initiate a call forwarding feature, a step of translating the selection to a "*72" code can be performed. In response to receiving a selection of the fourth option to deactivate call waiting, a step of translating the selection to a "*70" code can be performed. In response to receiving a selection of the fifth option to block caller identification, a step of translating the selection to a "*67" code can be performed. In response to receiving a selection of the sixth option to report information, a step of routing the call to "411" can be performed. In response to receiving a selection of the seventh option to speak to a service representative, a step of routing the call to the service representative can be performed. In response to receiving a selection of the eighth option for directory assistance, a step of routing the call to "411" can be performed. In response to receiving a selection of the ninth option to receive a product, a step of provisioning the product for the originating party 12 can be performed.

For selections which result in a translation to a "*" code, a message is returned to the SSP 28 to initiate activation of its corresponding pay-per-use feature. Further, a billing record for use of the feature is generated.

Thus, there has been described herein concepts, as well as several embodiments including preferred embodiments of methods, systems and articles for ordering a telecommunication service.

Because the various embodiments of the present invention use a service code having an alphabetical abbreviation for a name of a telecommunication service, they provide a significant improvement in providing ease for customers to order the telecommunication service. Further, SS7 network intelligence is used to recognize where the order originated. As a result, an originating party need not enter his/her telephone number during the ordering process.

The resulting ordering engine is fast, direct, and convenient. The aforementioned service code can be advertised on billboards, direct mailings, and radio broadcasts. An advertisement can include a message such as "to order voice mail, just dial *VM and we'll do the rest."

The menu-mode platform provides all telephone network terminals with a default mode for ordering and accessing popular and potentially difficult-to-implement services using an easy-to-remember code. The menu-mode platform provides centralized access to service and product ordering in an automated manner. The menu-mode platform assists in provisioning and billing pay-per-use products directly from a menu.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising the steps of:

initiating a telecommunications network trigger based upon a menu code dialed from an originating party, the menu code including at least one of "*M" or "#M"; and providing a menu of a plurality of telecommunications options corresponding to telecommunications network services, the menu provided in response to the telecommunications network trigger;

wherein the plurality of telecommunication options includes a first option to initiate a conference call, a second option to initiate an automatic call back, a third option to initiate call forwarding, a fourth option to deactivate call waiting, a fifth option to block caller identification, a sixth option to report information, a seventh option to speak to a service representative, an eight option for directory assistance, and a ninth option to receive a product.

2. The method of claim 1 wherein the telecommunication network trigger includes an advanced intelligent network (AIN) trigger.

3. The method of claim 1 further comprising the steps of:

receiving a selection from the originating party; and performing an action based upon the selection.

4. The method of claim 3 wherein the action includes routing the call based upon the selection.

5. The method of claim 3 wherein the action includes translating the selection to a service code.

6. A system comprising:

a network element to provide a menu of a plurality of telecommunication options corresponding to telecommunications network services, the menu provided in response to a telecommunication network trigger, the telecommunications network trigger based upon a menu code dialed from an originating party, the menu code including at least one of "*M,""#M" or combinations thereof;

wherein the plurality of telecommunication options includes a first option to initiate a conference call, a second option to initiate an automate call back, a third option to initiate call forwarding, a fourth option to deactivate call waiting, a fifth option to block caller identification, a sixth option to report information, a seventh option to speak to a service representative, an eight option for directory assistance, and a ninth option to receive a product.

7. The system of claim 6 wherein the network element comprises an intelligent peripheral.

8. The system of claim 6 wherein the telecommunication network trigger includes an advanced intelligent network (AIN) trigger.

9. The system of claim 6 wherein the network element is operative to receive a selection from the originating party, and to perform an action based upon the selection.

10. The system of claim 9 wherein the action includes routing the call based upon the selection.

11. The system of claim 9 wherein the action includes translating the selection to a service code.

* * * * *